(12) United States Patent
Steele, Jr.

(10) Patent No.: US 10,922,052 B2
(45) Date of Patent: Feb. 16, 2021

(54) GENERATING PSEUDORANDOM NUMBER SEQUENCES BY NONLINEAR MIXING OF MULTIPLE SUBSIDIARY PSEUDORANDOM NUMBER GENERATORS

(71) Applicant: Oracle International Corporation, Redwood Shores, CA (US)

(72) Inventor: Guy L. Steele, Jr., Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 108 days.

(21) Appl. No.: 14/880,798

(22) Filed: Oct. 12, 2015

(65) Prior Publication Data

US 2017/0102922 A1 Apr. 13, 2017

(51) Int. Cl.
*G06F 7/58* (2006.01)
(52) U.S. Cl.
CPC .............. *G06F 7/582* (2013.01); *G06F 7/586* (2013.01)
(58) Field of Classification Search
USPC ................................................. 708/250–256
See application file for complete search history.

(56) References Cited

U.S. PATENT DOCUMENTS 5,943,248 A 8/1999 Clapp
2009/0292751 A1* 11/2009 Schneider ............... G06F 7/582
708/250
2013/0129088 A1* 5/2013 Ivarez Maranon ..... G06F 7/582
380/46
2015/0095389 A1 4/2015 Steele

OTHER PUBLICATIONS

GPU Implementation of Scalable Non-Linear Congruential Generator for Cryptography Applications, Aditya Belsare et al, BLSVLSI '13, Paris, France, May 2-3, 2013.*
"Independent", www.merriam-webster.com, Merriam Webster, Jul. 10, 2014 web archive (Year: 2014).*
D. Patterson et al., Computer Organization and Design, the Hardware/Software Interface, Elsevier, 4th ed revised printing, 2012 (Year: 2012).*
J. Hennessy, et al., Computer Architecture: A Quantitative Approach, Elsevier, 3rd ed., 2014 (Year: 2014).*

(Continued)

*Primary Examiner* — Andrew Caldwell
*Assistant Examiner* — Emily E Larocque
(74) *Attorney, Agent, or Firm* — Hickman Palermo Becker Bingham LLP

(57) ABSTRACT

A method and apparatus is provided for generating pseudorandom numbers in a way that is deterministic (i.e., repeatable), that passes statistical tests, can have multiple instances of objects generating pseudorandom numbers at the same time. Also, the collection of pseudorandom numbers generated by multiple instances have the same statistical properties as numbers generated by a single instance (i.e., randomness). Embodiments described herein generate pseudorandom values by using a plurality of subsidiary linear congruential generators and combining their outputs nonlinearly. According to embodiments, after their outputs have been combined, a mixing function is applied. Embodiments include an on-demand split method in the style of the SplitMix algorithm.

24 Claims, 4 Drawing Sheets

```
(1) s1 := (a1 × s1 + g1) mod 2^64                                    200
(2) s2 := (a2 × s2 + g2) mod 2^64
(3) r := (s1 ROTATELEFT 32) XOR s2
(4) r := r ROTATELEFT (s1 SHIFTRIGHT 58)
(5) r := r × a3
(6) return (r XOR (r SHIFTRIGHT 32))

class TwoLCG                                                         210
    long s1, s2;
    final long g1, g2; // must be odd public long generate()
        s1 = s1 * 3202034522624059733L + g1;
        s2 = s2 * 3935559000370003845L + g2;
        long r = ((s1 << 32) | (s1 >>> 32)) ^ s2;
        long t= s1>>> 58;
        r = (r << (t & 0x3F)) | (r >> ((-t) & 0x3F));
        r *= 2685821657736338717L;
        return (r ^ (r >>> 32));

public TwoLCG split()
        return new TwoLCG(generate(), generate(), generate(), generate());
```

(56) References Cited

OTHER PUBLICATIONS

Schaathun et al., "Evaluation of Splittable Pseudo-Random Generators", dated May 12, 2015, 20 pages.
Mascagni et al., "Algorithm 806: SPRNG: A Scalable Library for Pseudorandom Number Generation", ACM, dated 2001, 26 pages.
Marsaglia et al., "Some difficult-to-pass tests of randomness", dated 2002, 3 pages.
Claessen et al., "Splittable Pseudorandom Number Generators Using Cryptographic Hasing", dated Sep. 2013, 12 pages.
David Stafford, "Better Bit Mixing—Improving on MurmurHash3's 64-bit Finalizer", Twiddling the Bits, dated Sep. 2015, 4 pages.
Empirical Testing of Random Number Generators, "TestU0", dated Aug. 2009., 2 pages.
Guy L. Steele Jr. et al., "Fast Splittable Pseudorandom Number Generators", AMC, OOPSLA '14, Oct. 20-24, 2014, 20 pages.
HotBits: Genuine Random Numbers, "Hot Bits: Genuine random numbers, generated by radioactive decay", dated Sep. 2006, 2 pages.
L'ecuyer et al., "An Object-Oriented Random-Number Package With Many Long Streams and Substreams", 2002 INFORMS vol. 50, No. 6, Nov.-Dec. 2002, 3 pages.
L'ecuyer, Pierre, "Efficient and Portable Combined Random Number Generators", AMC, vol. 31, No. 6, dated Jun. 1988, 9 pages.
Carmon et al., "Good Parameters and Implementations for Combined Multiple Recursive Random Number Generators", dated Jan. 1999, Operations Research, 8 pages.
Lennart Augustsson, "Off-topic, but question about history", dated Aug. 30, 2013, 1 page.
Rukhin et al., "A Statistical Test Suite for Random and Pseudorandom Number Generators for Cryptographic Applications", dated Apr. 2010, 131 pages.
Matsumoto et al., "Mersenne Twister: A 623-Dimensionally Equidistributed Uniform Pseudo-Random Number Generator", ACM Modeling and Computer Simulation, vol. 8, No. 1, Jan. 1998, pp. 3-30.
Melissa E. O'Neill, "PCG: A Family of Simple Fast Space-Efficient Statistically Good Algorithms for Random Number Generation", ACM Mathematical Software, vol. V, No. N, last viewed Sep. 30, 2015, 46 pgs.
MurmurHash3—smhasher—MurmurHash3 information and brief perfomance results—Test your hash functions.—Google Project Hosting, dated Sep. 2015, 7 pages.
Pierre L'ecuyer, "Tables of Linear Congruential Generators of Different Sizes and Good Lattice Structure", Mathematics of Computation vol. 68, No. 225, Jan. 1999, pp. 249-260.
Pierre L'ecuyer, "TestU01: A C Library for Empirical Testing of Random Number Generators", ACM Transactions on Mathematical Software, vol. 33, No. 4, Article 22, Publication date: Aug. 2007. 40 pgs.
PractRand, "(Practically Random) is a C++ library of pseudo-random number generators (PRNGs, or just RNGs) and statistical tests for RNGs", version 0.92, dated Sep. 2015, 6 pages.
Robert G. Brown's General Tools Page, "Dieharder", Version 3.31.1, dated 2015, 9 pages.
Leiserson et al., "Deterministic Parallel Random-Number Generation for Dynamic-Multithreading Platforms", Copyright © 2012 ACM, 12 pages.

\* cited by examiner

102 ADVANCE THE STATE OF TWO OR MORE SUBSIDIARY PSEUDORANDOM NUMBER GENERATORS

104 RECEIVE A REQUEST FOR A PSEUDORANDOM NUMBER

106 NONLINEARLY COMBINE TWO OR MORE COMPONENT PSEUDORANDOM NUMBERS TO PRODUCE A PARTICULAR PSEUDORANDOM NUMBER, WHEREIN EACH OF THE TWO OR MORE COMPONENT PSEUDORANDOM NUMBERS IS GENERATED BY A RESPECTIVE SUBSIDIARY COMPONENT PSEUDORANDOM NUMBER GENERATOR OF THE TWO OR MORE SUBSIDIARY PSEUDORANDOM NUMBER GENERATORS

108 DETERMINE A RESPONSE TO THE REQUEST BASED, AT LEAST IN PART, ON THE PARTICULAR PSEUDORANDOM NUMBER

110 RETURN THE RESPONSE TO THE REQUEST

FIG. 2

(1) s1 := (a1 × s1 + g1) mod $2^{64}$       ← 200

(2) s2 := (a2 × s2 + g2) mod $2^{64}$ (3) r := (s1 ROTATELEFT 32) XOR s2

(4) r := r ROTATELEFT (s1 SHIFTRIGHT 58)

(5) r := r × a3

(6) return (r XOR (r SHIFTRIGHT 32))

```
class TwoLCG long s1, s2;                                              ← 210 final long g1, g2; // must be odd public long generate()

s1 = s1 * 3202034522624059733L + g1;

s2 = s2 * 3935559000370003845L + g2;

long r = ((s1 << 32) | (s1 >>> 32)) ^ s2;

long t= s1>>> 58;

r = (r << (t & 0x3F)) | (r >> ((-t) & 0x3F));

r *= 2685821657736338717L;

return (r ^ (r >>> 32));

public TwoLCG split()

return new TwoLCG(generate(), generate(), generate(), generate());
```

FIG. 3

(1) r := (s1 ROTATELEFT 32) XOR s2              /―300

(2) r := r ROTATELEFT (s1 SHIFTRIGHT 58)

(3) r := r × a3

(4) s1 := (a1 × s1 + g1) mod $2^{64}$ (5) s2 := (a2 × s2 + g2) mod $2^{64}$ (6) return (r XOR (r SHIFTRIGHT 32))

```
class TwoLCG                                        /―310 long s1, s2;

final long g1, g2; // must be odd public long generate()

long r = ((s1 << 32) | (s1 >>> 32)) ^ s2;

long t= s1>>> 58;

r = (r << (t & 0x3F)) | (r >> ((-t) & 0x3F));

r *= 2685821657736338717L;

s1 = s1 * 3202034522624059733L + g1;

s2 = s2 * 3935559000370003845L + g2;

return (r ^ (r >>> 32));

public TwoLCG split()

return new TwoLCG(generate(), generate(), generate(), generate());
```

GENERATING PSEUDORANDOM NUMBER SEQUENCES BY NONLINEAR MIXING OF MULTIPLE SUBSIDIARY PSEUDORANDOM NUMBER GENERATORS

CROSS-REFERENCE TO RELATED APPLICATIONS

This application is related to application Ser. No. 14/043,372, titled "Method and system for generating pseudorandom numbers in parallel", filed Oct. 1, 2013, the entire contents of which is hereby incorporated by reference as if fully set forth herein.

FIELD OF THE INVENTION

The disclosed embodiments relate to techniques for generating pseudorandom numbers in computer systems. More specifically, the disclosed embodiments relate to techniques for a splittable process for efficiently generating pseudorandom numbers with good statistical properties.

BACKGROUND

Many computational algorithms and applications rely on randomness for proper functioning. For example, Monte Carlo methods rely on repeated random sampling to obtain numerical results, and Markov chains randomly change state within a designated state space.

Such applications require random or pseudorandom numbers or bit strings with good statistical properties. The reliability of a source producing pseudorandom numbers with good statistical properties may be judged by applying any of a variety of statistical tests to its output. One widely used test is the DieHarder software suite. Another is a statistical test suite from NIST, and perhaps the best-known today is TestU01, including its most stringent set of tests known as BigCrush. Another modern test suite, not so widely known, is PractRand.

It is possible to generate "genuinely" random numbers by using the results of a physical process that is believed to have truly random behavior. One source of such bits, available on the Internet, is the "HotBits" generator. Reliance of such generators on measuring a physical process results in significant delay between random number generation. As such, it is infeasible to utilize such a generator to produce pseudorandom numbers for applications that require many random numbers in a relatively short period of time (such as a Monte Carlo method). Furthermore, parallelizing the generation of random numbers from a physical process is not repeatable for testing purposes.

Therefore, sources of pseudorandom numbers or bit strings have been developed, where a sequence of pseudorandom numbers or bit strings appears to be (or behaves as if) generated by a truly random source. There is a large body of literature on algorithms for generating pseudorandom number sequences.

An example of such an algorithm is the SplitMix algorithm, i.e., used in JDK8 for class SplittableRandom, and described in application Ser. No. 14/043,372. The SplitMix algorithm is a completely splittable pseudorandom number generator that is highly satisfactory for many purposes, but has two possible drawbacks: (a) its state space is 127 bits, which may be on the small side for large-scale applications, and (b) it has some known statistical weaknesses, even for the case of a single instance.

It would be beneficial to generate pseudorandom numbers based on a large state space, which is suitable for large-scale applications, and in a manner that is statistically robust and completely splittable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 depicts a flowchart for generating a pseudorandom number by nonlinearly combining two or more component pseudorandom numbers generated from two or more subsidiary pseudorandom number generators.

FIG. 2 depicts example pseudocode for generation of pseudorandom numbers by nonlinearly combining two or more component pseudorandom numbers generated from two distinct linear congruential generators defined by state and parameter values.

FIG. 3 depicts example pseudocode for generation of pseudorandom numbers by nonlinearly combining two or more component pseudorandom numbers generated from two distinct linear congruential generators defined by state and parameter values.

DETAILED DESCRIPTION

Figure 4:
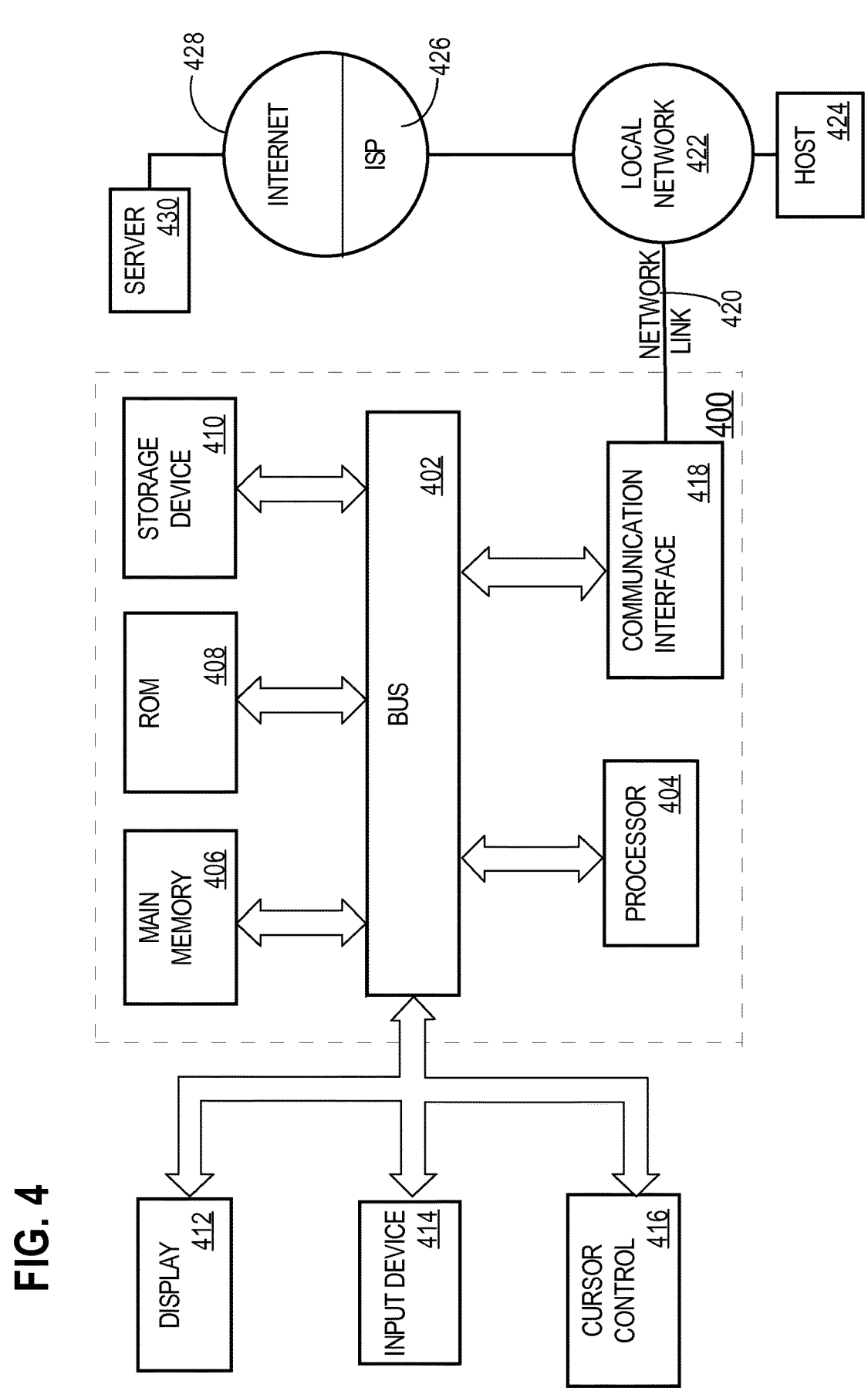
FIG. 4 is a block diagram of a computer system on which embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to embodiments, herein is described a pseudorandom number generator (PRNG) that is deterministic, splittable, and generates numbers that have good statistical properties (i.e., that are sufficiently random). This PRNG is based on nonlinearly combining outputs from two linear congruential generators (LCGs).

A single LCG by itself has notorious weaknesses: (i) the low-order bits of the result are not very random at all (numbering the bits with nonnegative indices such that the least significant bit has index 0, one may observe that bit i has period $2^{i+1}$), and (ii) pairs of consecutive values, when used to plot points in the x-y plane, tend to cluster along a small set of diagonal lines.

However, embodiments overcome this poor behavior of the component LCGs by nonlinearly combining pseudorandom numbers generated by two or more LCGs (referred to herein as "subsidiary LCGs"). According to embodiments, such combination may include one or more of: (1) utilizing the high 32 bits from each of two 64-bit pseudorandom numbers generated from subsidiary LCGs to obtain 64 bits with fairly good randomness; (2) utilizing the high 6 bits of one subsidiary LCG (which are "quite random") to permute (e.g., ROTATE) this combined result—this is a nonlinear combining step; and (3) applying a mixing function (e.g., that is similar to mixing functions used in SplitMix).

As such, embodiments of the described PRNG (referred to herein as "TwoLCG") works within twice the state space of SplitMix (254 bits rather than 127), and has a comparable speed to SplitMix (i.e., SplitMix uses 9 arithmetic operations per 64 bits generated, whereas TwoLCG uses 11 arithmetic operations—reducible to 10 on some architectures—but with more opportunities for instruction parallelism on superscalar architectures). Furthermore, TwoLCG has no known statistical weaknesses in the case of a single instance, and a significantly smaller probability of accidental correlations among multiple instances than SplitMix.

Generating Pseudorandom Numbers

There is a close relationship between the generation of pseudorandom numbers and the generation of hash values for data structures. In particular, a stream of pseudorandom numbers can, in principle, be generated by applying an appropriate hashing function to a stream of successive integers.

Some hash functions are constructed by first reducing a large data structure to an integer of fixed size and then applying a finalizer, which may be a mixing function that "mixes" the values of the individual bits used to represent the integer. Examples of finalizer functions each takes a 64-bit input and produces a 64-bit result. Each of these functions is bijective: distinct inputs produce distinct results. This type of mixer function also has good avalanche statistics, meaning that, on average over all possible inputs, changing just one bit of the input has, for each of the 64 output bits, a roughly 50% chance of changing that output bit.

These functions achieve mixing by applying an alternating series of XORSHIFT steps and multiplication steps. An XORSHIFT step transforms an input value z into z XOR (z SHIFTRIGHT k)) for some integer shift distance k, whereas a multiplication step transforms an input value z into z×a for some multiplier a. The intuition behind these kinds of steps is that an XORSHIFT step uses information in the high-order bits to modify the low-order bits, while a multiplication step uses information in the low-order bits to modify the high-order bits. In other words, in an XORSHIFT step information flows from left to right, whereas in a multiplication step information flows from right to left, so alternating such steps can achieve good mixing by getting information to slosh back and forth within the word, so that eventually every input bit can influence every output bit.

Splittable Algorithm

A more difficult problem than generating a sequence of pseudorandom numbers by a sequential method is to provide a deterministic algorithm, device, process, or method that can be used by multiple shared threads of control that execute in parallel, in such a manner that each thread can independently generate a sequence of pseudorandom numbers and yet the single set of numbers generated by all the threads collectively still has good statistical properties.

It is desirable to have such a deterministic algorithm, device, process, or method when using parallel processing hardware, such as CPU clusters, to carry out the computations for an application, such as a Monte Carlo simulation. It is also desirable to have such a deterministic algorithm, device, process, or method when using vector processing or SIMD hardware such as one or more graphic processing units (GPUs) to carry out computations of that class.

Leiserson, Schardl, and Sukha describe an algorithm they call DotMix, which allows computational tasks running in parallel to generate pseudorandom sequences independently. In their model, a computation initially consists of a single task, and any task may at any time either spawn a new task, synchronize with tasks it has spawned (waiting for them to complete), or generate a pseudorandom number. The basic idea is that each such action (spawn, sync, or generate) is associated with a unique "pedigree", which is an ordered vector of integers. Computations occur at each spawn, sync, or generate operation to ensure that every action, within the set of all actions performed by all tasks, will have a distinct pedigree.

Additionally, the generate operation produces a pseudorandom number by performing a two-part mathematical computation on the pedigree of the generate operation: a dot product with a vector of coefficients, followed by a "mixing" operation that conceptually "scrambles" the result of the dot product. The name "DotMix" comes from this two part-process of a dot product followed by a mix function. The vector of coefficients is drawn from a fixed table that is defined, ideally by some truly random process, before execution of the initial task begins. Note that a dot product is a linear function that, when the vector of coefficients is regarded as fixed, combines the elements of the pedigree linearly.

SplitMix is distantly related to DotMix, and allows computational tasks running in parallel to generate pseudorandom sequences independently. However, the algorithm is not specifically tied to the parallel task structure, or to actions such as spawn and sync. Rather, it is object-oriented: each SplitMix PRNG object contains some state and supports at least two methods: generate and split. The generate method advances the internal state of the object and returns a pseudorandom value (typically a 64-bit integer). The split method advances the internal state of the object and returns a newly created PRNG object. The outputs of the two objects are likely to be statistically independent.

The version of SplitMix adopted for use in JDK8 (version 8 of the Java Development Kit) uses 127 bits of internal state per object, in the form of two 64-bit integers, one of which is required to be odd. For some purposes this may be an adequate amount of internal state, but for other purposes, the amount of state may not provide sufficiently strong guarantees of statistical independence.

L'Ecuyer Pseudorandom Number Generators

L'Ecuyer presents tables that describe, for a variety of computer word sizes, constants a that, when used to construct linear congruential generators, produce generators with particularly good figures of merit based on the structure of a lattice of points determined by the output of the generator. In particular, the values a=3202034522624059733 and a=3935559000370003845 are listed as suitable for use in a generator of the form $x'=ax+c \mod 2^{64}$ for any odd c, and the value a=2685821657736338717 is listed as suitable for use in a generator of the form $x'=ax \mod 2^{64}$.

L'Ecuyer also describes a way to create a PRNG of good quality and very long period by combining two or more multiplicative linear congruential generators (MLCGs), and remarks that the period of the combined generator can be "split" (partitioned) into separate sections easily because each of the underlying generators can be so partitioned. However, disadvantageously, the splitting needs to be "preplanned" rather than performed on demand by any thread at any time. The technique combines the two or more MLCGs linearly; for each pseudorandom value to be generated overall, the technique uses each MLCG to generate a value, then computes the sum of those generated values modulo some fixed integer m. The result is a pseudorandomly chosen nonnegative value that is less than m.

In the mid-1990s, Augustsson implemented L'Ecuyer's algorithm in purely functional form as part of the Haskell standard library System.Random; the code now in that library contains a kernel with two functions stdNext and stdSplit. The implementation of stdNext is a faithful rendition of L'Ecuyer's algorithm, but the stdSplit method does not split the period in the manner suggested by L'Ecuyer. Instead, stdSplit uses an ad hoc on-demand method that, by its own admission, has "no statistical foundation," but is not that different in structure from SplitMix except that it fails to try to compute "random" values for initializing newly generated objects. However, the stdSplit function in the Haskell standard library System.Random has at least one severe defect that is remarked upon by Claessen and Palka.

Claessen and Palka further describe a superior implementation of the same purely functional API that is similar in spirit to DotMix. This implementation generates random values by encoding the path in the split tree as a sequence of numbers, and then applies a cryptographically strong hash function. This path encoding and hash function are designed to allow successive pseudorandom values to be computed incrementally in constant time, independent of the path length.

L'Ecuyer et al. describe an object-oriented C++ PRNG package RngStream that supports repeatedly splitting its very long period (approximately $2^{191}$) into streams and substreams. This package uses a combined multiple recursive generator known as MRG32k3a in which multiple smaller PRNGs depend on each other recursively according to a linear formula.

O'Neill discusses the use of bit-rotate operations as well as XORSHIFT steps to perform nonlinear mixing of the output of a single LCG.

Nonlinear Combination of Two or More Component Pseudorandom Numbers

Embodiments described herein generate pseudorandom values by using a plurality of subsidiary linear congruential generators and combining their outputs nonlinearly. According to embodiments, after their outputs have been combined, a mixing function is applied. Embodiments include an on-demand split method in the style of the SplitMix algorithm.

Embodiments generate pseudorandom numbers in a way that is deterministic (i.e., repeatable), that passes statistical tests, and can have multiple instances of PRNGs generating pseudorandom numbers at the same time. Also, the set of pseudorandom numbers generated by multiple instances have the same statistical properties as numbers generated by a single instance.

TwoLCG—Subsidiary Pseudorandom Number Generators

FIG. 1 depicts a flowchart 100 for generating a pseudorandom number by nonlinearly combining two or more component pseudorandom numbers generated from two or more subsidiary pseudorandom number generators. According to embodiments, TwoLCG is implemented as an object. However, TwoLCG may be implemented in any manner, according to particular implementations.

At step 102, the states of two or more subsidiary pseudorandom number generators are advanced. For example, a PRNG referred to herein as "TwoLCG" uses 254 bits of internal state in the form of four 64-bit integers, two of which are required to be odd. These four 64-bit integers are called: s1, s2, g1, and g2 (where g1 and g2 must be odd). The values s1 and s2 are referred to as "seeds" and the values g1 and g2 are referred to as "gamma values". Since the integers are 64-bit integers, then 128-bit arithmetic is not required to manipulate these values. Furthermore, it is not required that the state be regarded as an array.

Once values have been chosen for s1 and s2 and g1 and g2 for any instance of TwoLCG, s1 and s2 represent a mutable state that may be altered whenever TwoLCG performs a generate or split operation. However, g1 and g2, once chosen (i.e., at initialization of the instance of TwoLCG), are unchanging for that instance of TwoLCG. Thus, one may regard TwoLCG instances as members of a family of PRNGs, where each instance has 128 bits of state (s1 and s2) and furthermore is parameterized by an additional 126 bits of information (g1 and g2).

In addition, embodiments make use of three 64-bit fixed integer constants a1, a2, and a3 that are identical for all object instances for a given implementation of TwoLCG. According to a particular embodiment, these constants are as follows: a1=3202034522624059733; a2=3935559000370003845; and a3=2685821657736338717.

However, other constant values may be applied within embodiments. For some purposes, either or both of the constants a1 and a2 may be advantageously chosen so that the period of the respective linear congruential generator is maximal. As L'Ecuyer points out, this occurs when a1 (or a2) is equal to 5 mod 8. For some purposes, the constant a3 may be advantageously chosen so that multiplication by a3 modulo $2^{64}$ is a bijective function; this occurs when a3 is odd.

The values of s1, s2, g1, and g2 define two distinct linear congruential generators, one whose state is (s1, g1) and one whose state is (s2, g2). These two distinct LCGs are subsidiary pseudorandom number generators for TwoLCG. Because the subsidiary linear congruential generators have distinct constant multipliers a1 and a2, the state spaces of the generators are distinct.

According to an embodiment, an example technique for TwoLCG generating a pseudorandom number by nonlinearly combining two or more component pseudorandom numbers generated from the two distinct LCGs defined by s1, s2, g1, and g2 is described by the pseudocode in Procedure 200 of FIG. 2.

Line (1) of Procedure 200 advances the state of the first linear congruential generator; line (2) likewise advances the state of the second linear congruential generator. More specifically, the LCG whose state is (s1, g1) is advanced by multiplying s1 by the constant a1 and adding g1, the result of which is MODed by $2^{64}$. This state advancement produces a new s1 (or a new pseudorandom number output) for the subsidiary LCG. Similarly, the LCG whose state is (s2, g2) is advanced by multiplying s2 by the constant a2 and adding g2, the result of which is MODed by $2^{64}$. This state advancement likewise produces a new s2 (or a new pseudorandom number output) for the second subsidiary LCG.

TwoLCG—Nonlinear Combinations

At step 104, a request for a pseudorandom number is received. For example, an object implementing TwoLCG receives a request to generate a pseudorandom number (i.e., TwoLCGObj.generate( ) as described in connection with Procedure 210). Such a request for a pseudorandom number may be received in any manner according to embodiments. According to embodiments, steps 106, 108, and 110 of flowchart 100 are performed in response to receiving the request.

At step 106, two or more component pseudorandom numbers are nonlinearly combined to produce a particular pseudorandom number, wherein each of the two or more component pseudorandom numbers is generated by a respective subsidiary component pseudorandom number generator of the two or more subsidiary pseudorandom number generators. Nonlinear combination of the component pseudorandom numbers (i.e., s1 and s2) treats these values asymmetrically. This asymmetric treatment works to counteract any statistical correlations between the component pseudorandom numbers, increasing the likelihood of one or more instances of TwoLCG generating pseudorandom numbers with good collective statistical properties.

Procedure 200 depicts an example nonlinear combination of component pseudorandom numbers (i.e., s1 and s2). Specifically, line (3) of procedure 200 combines the outputs of the two distinct LCGs (i.e., s1 and s2) nonlinearly by first permuting the bits of s1 (using a ROTATELEFT operation) and then using a bitwise XOR operation on the results of the ROTATELEFT operation and s2, to produce a new value r.

Line (4) of procedure 200 performs a further nonlinear combination step by using the high 6 bits of s1 (obtained by using a SHIFTRIGHT operation on s1 for a distance of 58 bit positions) to determine a number of bit positions by which r is to be rotated by a ROTATELEFT operation. Since 6 bits can represent the decimal values 0-63, and the high order bits of s1 are known to have good statistical properties, this step has the potential to randomly rotate r to any possible rotate result (since r is a 64-bit value).

According to embodiments, and as demonstrated by lines (3)-(4) of procedure 200, permutation of one of the component pseudorandom numbers is based on another component pseudorandom number. Basing permutation of one component pseudorandom number on another component pseudorandom number adds another element of randomness into TwoLCG, and increases the likelihood of the resulting pseudorandom number having good statistical properties.

Embodiments comprise other nonlinear combination steps (other than ROTATE), such as application of a quadratic (or higher order) nonlinear polynomial, etc. As another example, a component pseudorandom number may be permuted based on a flip operation. Specifically, whereas a rotation operation by distance k permutes a 64-bit word by moving the bit in bit position j to bit position (j+k) mod 64 or to bit position (j−k) mod 64, a flip operation permutes a 64-bit word by moving the bit in bit position j to bit position (j XOR k).

TwoLCG—Mixing Functions

At step 108 of flowchart 100, a response to the request is determined based, at least in part, on the particular pseudorandom number. At step 110, the response to the request is returned. According to an embodiment, TwoLCG simply returns, to the entity that made the request for a pseudorandom number, the result of the nonlinear combination described in step 106.

According to an alternative embodiment, TwoLCG applies a mixing function to the result of the nonlinear combination prior to returning the result. The rotation step depicted in FIG. 2 does not alter the number of 1-bits in a word, and altering the number of 1-bits in a word increases the likelihood of the word having good statistical properties. Application of a mixing function addresses that problem by altering the number of 1-bits in a word. As such, utilization of a mixing function in addition to the nonlinear combination of component pseudorandom values works to avoid correlations between multiple generator objects used in parallel.

According to embodiments, a mixing function further treats the component pseudorandom numbers (i.e., s1 and s2) asymmetrically, in addition to the asymmetrical treatment of these component pseudorandom numbers in the nonlinear combination described in connection with step 106. For example, lines (5) and (6) of Procedure 200 accomplish a final mixing on the value of r by first multiplying it by a3 and then performing an XORSHIFT step. Note that line (6) contains two operations XOR and RIGHTSHIFT, but on architectures that allow direct addressing of the two halves of a 64-bit register as if they were two 32-bit registers, it may be possible to implement the computation in line (6) as a single 32-bit XOR instruction. Other mixing functions may be used according to embodiments.

TwoLCG—Splittable Algorithm

An initial instance of a TwoLCG object may be constructed using arbitrary arguments (i.e., to a public constructor in the case of a Java implementation). As such, according to embodiments, in order to perform a split operation, TwoLCG performs four generate operations to obtain four 64-bit pseudorandom numbers (generated according to TwoLCG) and initializes another instance of TwoLCG with those values as s1, s2, g1, and g2 for the new instance. Nevertheless, a user may wish to use specific seeds for repeatability, or may choose to use some external entropy source to select the initial state.

According to embodiments, in case an instance of TwoLCG is initialized with a g1 or g2 that is even, TwoLCG forces the received g1 and g2 to be odd. This may be accomplished by using a bitwise OR operation with the integer constant 1.

Procedure 210 of FIG. 2 describes such a TwoLCG split function and also includes the procedure for generating a pseudorandom number illustrated in procedure 200. Furthermore, procedure 210 and also procedure 310 (of FIG. 3) utilize Java-based language conventions (e.g., the operator ">>>" represents an unsigned right shift).

Once initialized, an instance of TwoLCG that is split from a previously-instantiated instance of TwoLCG is extremely likely to generate a sequence of pseudorandom numbers that has little or no statistical correlation with the sequence of numbers generated by the instance of TwoLCG from which it was split. As such, the vast majority of split instances of TwoLCG may operate in parallel while producing pseudorandom numbers with good statistical qualities (i.e., that pass the statistical tests for randomness). Because such a split operation produces two distinct instances of TwoLCG that operate independently, no synchronization overhead is involved in operating the multiple instances of TwoLCG.

If the four arguments to a TwoLCG constructor are themselves chosen uniformly at random, then the interleaved outputs of two generators constructed in this way will pass the TestU01 BigCrush test suite and also the PractRand test suite with probability exceeding $1-2^{126}$. (This is well in excess of the sensitivity of the test suites themselves.)

In fact, the interleaved output of two such TwoLCG generators ought always pass the test suites if either their g1 values differ or their g2 values differ. Moreover, in many cases such output passes the test suites even if the two LCGs have exactly the same g1 and g2 values. Roughly speaking, if n1 is the number of times a first LCG of one PRNG must be advanced to make the s1 fields identical, and n2 is the number of times the second LCG of one PRNG must be advanced to make the s2 fields identical, then the interleaved output is likely to pass the test suites if neither n1 nor n2 has more than about 16 trailing 0-bits. Given this understanding, then the interleaved output of two uniformly randomly chosen generators ought to pass the test suites with probability exceeding $1-2^{141}$. Furthermore, the interleaved output of more than two such objects likewise has a very high probability of passing both test suites.

TwoLCG—Optimizing Instruction Parallelism

State advancement for the subsidiary pseudorandom number generators for embodiments of TwoLCG can occur before or after a pseudorandom number is generated in response to a request for a pseudorandom number. For example, an alternate embodiment for performing a generate operation is described in pseudocode as shown in Procedure 300 of FIG. 3.

More specifically, Procedure 300 differs from the pseudocode in Procedure 200 of FIG. 2 in that the steps have been rearranged into a different order, advantageously allowing advancing of the states of the two LCGs to be performed in parallel with the operations that nonlinearly combine their outputs. Procedure 310 of FIG. 3 is pseudocode that describes the generate procedure of Procedure 300 in further detail. As such, Procedure 310 differs from the pseudocode in Procedure 210 in that two lines in the generate method are moved from the beginning of the method body to a point just before the return statement.

Additional Details

Embodiments may perform any of, more than one of, or all of the following:

- Use more than two linear congruential generators as the contained generators to be combined.
- Use generators other than linear congruential generators (for example, a linear shift-XOR feedback generator) as the subsidiary generators to be combined.
- Use a mixture of one or more linear congruential generators and one or more generators other than linear congruential generators as the subsidiary generators to be combined.
- Use arithmetic on integers of sizes other than 64 bits (for example, 128 bits or 256 bits).
- Use subsidiary generators that produce different numbers of output bits (for example, a 32-bit LCG and a 64-bit LCG, or a 64-bit LCG and a 128-bit LCG).
- Use multipliers other than the specific multipliers listed above as a1, a2, and a3.
- Use an alternate mixing step in place of lines (5) and (6) of Procedure 200 (FIG. 2), or omit the mixing step.
- Perform a different number of nonlinear combining steps than described above.
- Perform different kinds of nonlinear combining steps than described above.
- Perform nonlinear combining steps in a different order than described above.
- Perform one or more mixing steps before performing one or more nonlinear combining steps.
- Interleave mixing steps with nonlinear combining steps.
- Use bits other than the most significant to control a nonlinear mixing step, for example a rotation.
- Use bits derived from more than one LCG to control a nonlinear mixing step, for example a rotation.
- Use a rightward rotation instead of a leftward rotation.
- Use a bit permutation other than a rotation.
- Use bits other than the most significant of a word to control the permutation (e.g., rotation) of a word or partial word.

Implementation Details

In an embodiment, each of the processes described in connection with pseudorandom number generators described herein are performed automatically and may be implemented using one or more computer programs, other software or hardware elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Cloud Computing System

According to embodiments, a device that is running one or more instances of TwoLCG is part of a cloud or clustered computing system. A cloud or clustered computing system is a computing system that includes a collection of hardware and software components that function together to provide functionality such as, for example, storing data, processing commands, and/or providing services. In the context of the cloud computing system, each device a distinct active functional component that, according to embodiments, works with other distinct functional components to accomplish a particular task that the cloud computing system is requested to perform. According to embodiments, other distinct active functional components that are also part of the system provide the same functionality in parallel.

Underlying logical components of the cloud system may be replaced by different logical components without affecting the overall functionality of the cloud system. The complexity of the cloud system may be hidden from a client of the cloud system, such as a user or application, such that the client may not even need to be aware which software or hardware is being used by the system, as long as the functionality is provided from the system to the client.

To shield the client from the complexities of the cloud, many cloud systems include a client interface, and a component interface. The client interface exposes simple commands to the client in the form of an interface such as an application programming interface or a graphical user interface. The commands expose functionality of the cloud system to the client such that, when the cloud system receives commands from the client on the client interface, the cloud system carries out the requested function using one or more of a variety of functional components that may be hidden from the client. Several clients may be serviced by the cloud system in parallel using parallel instances of the client interface.

What is claimed is:

1. A computer-executed method comprising:
parallel processing hardware carrying out computations for a particular software application, executing on a computer system that comprises the parallel processing hardware, comprising:
producing, by a first process running on a processor of the parallel processing hardware, a first set of statistically-independent pseudorandom numbers by, for each pseudorandom number of the first set of statistically-independent pseudorandom numbers:
advancing the states of first two or more subsidiary pseudorandom number generators of a first instance of a pseudorandom number generator;
wherein a state space of each of the first two or more subsidiary pseudorandom number generators is independent from another state space of any other subsidiary pseudorandom number generator of the first two or more subsidiary pseudorandom number generators;
determining, by the first process, to generate a pseudorandom number;
in response to determining, by the first process, to generate a pseudorandom number based on the first instance of the pseudorandom number generator:
nonlinearly combining first two or more component pseudorandom numbers, asymmetrically, to produce a first pseudorandom number;
wherein a component operation of nonlinearly combining the first two or more component pseudorandom numbers is based, at least in part, on at least one state of the first two or more subsidiary pseudorandom number generators; and
wherein each of the first two or more component pseudorandom numbers is generated by a respective subsidiary pseudorandom number generator of the first two or more subsidiary pseudorandom number generators; and
producing, by a second process running on the processor of the parallel processing hardware in parallel with the first process, a second set of statistically-independent pseudorandom numbers;
wherein the second set of statistically-independent pseudorandom numbers are statistically-independent from the first set of statistically-independent pseudorandom numbers;
wherein the second process producing the second set of statistically-independent pseudorandom numbers comprises, for each pseudorandom number of the second set of statistically-independent pseudorandom numbers:
advancing the states of second two or more subsidiary pseudorandom number generators of a second instance of the pseudorandom number generator;
wherein a state space of each of the second two or more subsidiary pseudorandom number generators is independent from another state space of any other subsidiary pseudorandom number generator of the second two or more subsidiary pseudorandom number generators;
determining, by the second process, to generate a pseudorandom number;
in response to determining, by the second process, to generate a pseudorandom number based on the second instance of the pseudorandom number generator:
nonlinearly combining second two or more component pseudorandom numbers, asymmetrically, to produce a second pseudorandom number;
wherein a component operation of nonlinearly combining the second two or more component pseudorandom numbers is based, at least in part, on at least one state of the second two or more subsidiary pseudorandom number generators;
wherein each of the second two or more component pseudorandom numbers is generated by a respective subsidiary pseudorandom number generator of the second two or more subsidiary pseudorandom number generators; and
executing the particular software application, by the computing system, using the first set of statistically-independent pseudorandom numbers and the second set of statistically-independent pseudorandom numbers.

2. The method of claim 1, wherein nonlinearly combining the first two or more component pseudorandom numbers comprises:
permuting at least a particular pseudorandom number of the first two or more component pseudorandom numbers to produce a permuted pseudorandom number; and
combining the permuted pseudorandom number with one or more other component pseudorandom numbers of the first two or more component pseudorandom numbers.

3. The method of claim 2, wherein permuting at least the particular pseudorandom number of the first two or more component pseudorandom numbers comprises permuting the particular pseudorandom number based, at least in part, on at least a portion of another component pseudorandom number of the first two or more component pseudorandom numbers.

4. The method of claim 3, wherein permuting the particular pseudorandom number based, at least in part, on at least a portion of the other component pseudorandom number of the first two or more component pseudorandom numbers comprises basing the permuting on one or more highest-order bits of the other component pseudorandom number.

5. The method of claim 2, wherein permuting at least the particular pseudorandom number of the first two or more component pseudorandom numbers comprises rotating bits of the particular pseudorandom number.

6. The method of claim 1, further comprising: performing a mixing function on the first pseudorandom number to produce a mixed pseudorandom number.

7. The method of claim 1, further comprising:
the first process receiving a request to split the first instance of the pseudorandom number generator;
in response to receiving the request to split the first instance of the pseudorandom number generator, the first process initializing a third instance of the pseudorandom number generator based on the first instance of the pseudorandom number generator.

8. The method of claim 7, wherein the first process initializing the third instance of the pseudorandom number generator based on the first instance of the pseudorandom number generator further comprises:
generating a plurality of pseudorandom numbers based on the first instance of the pseudorandom number generator;

and initializing the third instance of the pseudorandom number generator based on the plurality of pseudorandom numbers.

9. The method of claim 7, further comprising the computing system operating the first instance of the pseudorandom number generator and the third instance of the pseudorandom number generator in parallel.

10. The method of claim 1, further comprising, prior to determining, by the first process, to generate a pseudorandom number:
receiving at least four pseudorandom values;
wherein each subsidiary pseudorandom number generator, of the first two or more subsidiary pseudorandom number generators, is based on at least two pseudorandom values of the at least four pseudorandom values.

11. The method of claim 1, further comprising the first process causing performance, in parallel, of (a) said advancing the states of the first two or more subsidiary pseudorandom number generators, and (b) said nonlinearly combining the first two or more component pseudorandom numbers.

12. The method of claim 1, further comprising:
utilizing, by the first process for an application, the first set of statistically-independent pseudorandom numbers; and
utilizing, by the second process for the application, the second set of statistically-independent pseudorandom numbers;
wherein said utilizing the first set of statistically-independent pseudorandom numbers for the application and said utilizing the second set of statistically-independent pseudorandom numbers for the application are performed in parallel.

13. One or more non-transitory computer-readable media storing one or more sequences of instructions that, when executed by one or more processors, cause:
parallel processing hardware carrying out computations for a particular software application, executing on a computer system that comprises the parallel processing hardware, comprising:
producing, by a first process running on a processor of the parallel processing hardware, a first set of statistically-independent pseudorandom numbers by, for each pseudorandom number of the first set of statistically-independent pseudorandom numbers:
advancing the states of first two or more subsidiary pseudorandom number generators of a first instance of a pseudorandom number generator;
wherein a state space of each of the first two or more subsidiary pseudorandom number generators is independent from another state space of any other subsidiary pseudorandom number generator of the first two or more subsidiary pseudorandom number generators;
determining, by the first process, to generate a pseudorandom number;
in response to determining, by the first process, to generate a pseudorandom number based on the first instance of the pseudorandom number generator:
nonlinearly combining first two or more component pseudorandom numbers, asymmetrically, to produce a first pseudorandom number;
wherein a component operation of nonlinearly combining the first two or more component pseudorandom numbers is based, at least in part, on at least one state of the first two or more subsidiary pseudorandom number generators; and
wherein each of the first two or more component pseudorandom numbers is generated by a respective subsidiary pseudorandom number generator of the first two or more subsidiary pseudorandom number generators; and
producing, by a second process running on the processor of the parallel processing hardware in parallel with the first process, a second set of statistically-independent pseudorandom numbers;
wherein the second set of statistically-independent pseudorandom numbers are statistically-independent from the first set of statistically-independent pseudorandom numbers;
wherein the second process producing the second set of statistically-independent pseudorandom numbers comprises, for each pseudorandom number of the second set of statistically-independent pseudorandom numbers:
advancing the states of second two or more subsidiary pseudorandom number generators of a second instance of the pseudorandom number generator;
wherein a state space of each of the second two or more subsidiary pseudorandom number generators is independent from another state space of any other subsidiary pseudorandom number generator of the second two or more subsidiary pseudorandom number generators;
determining, by the second process, to generate a pseudorandom number;
in response to determining, by the second process, to generate a pseudorandom number based on the second instance of the pseudorandom number generator:
nonlinearly combining second two or more component pseudorandom numbers, asymmetrically, to produce a second pseudorandom number;
wherein a component operation of nonlinearly combining the second two or more component pseudorandom numbers is based, at least in part, on at least one state of the second two or more subsidiary pseudorandom number generators; and
wherein each of the second two or more component pseudorandom numbers is generated by a respective subsidiary pseudorandom number generator of the second two or more subsidiary pseudorandom number generators;
executing the particular software application, by the computing system, using the first set of statistically-independent pseudorandom numbers and the second set of statistically-independent pseudorandom numbers.

14. The one or more non-transitory computer-readable media of claim 13, wherein nonlinearly combining the first two or more component pseudorandom numbers comprises:
permuting at least a particular pseudorandom number of the first two or more component pseudorandom numbers to produce a permuted pseudorandom number; and
combining the permuted pseudorandom number with one or more other component pseudorandom numbers of the first two or more component pseudorandom numbers.

15. The one or more non-transitory computer-readable media of claim 14, wherein permuting at least the particular pseudorandom number of the first two or more component pseudorandom numbers comprises permuting the particular pseudorandom number based, at least in part, on at least a portion of another component pseudorandom number of the first two or more component pseudorandom numbers.

16. The one or more non-transitory computer-readable media of claim 15, wherein permuting the particular pseudorandom number based, at least in part, on at least a portion of the other component pseudorandom number of the first two or more component pseudorandom numbers comprises basing the permuting on one or more highest-order bits of the other component pseudorandom number.

17. The one or more non-transitory computer-readable media of claim 14, wherein permuting at least the particular pseudorandom number of the first two or more component pseudorandom numbers comprises rotating bits of the particular pseudorandom number.

18. The one or more non-transitory computer-readable media of claim 13, wherein the one or more sequences of instructions further comprise instructions that, when executed by one or more processors, cause: performing a mixing function on the first pseudorandom number to produce a mixed pseudorandom number.

19. The one or more non-transitory computer-readable media of claim 13, wherein the one or more sequences of instructions further comprise instructions that, when executed by one or more processors, cause:
the first process receiving a request to split the first instance of the pseudorandom number generator;
in response to receiving the request to split the first instance of the pseudorandom number generator, the first process initializing a third instance of the pseudorandom number generator based on the first instance of the pseudorandom number generator.

20. The one or more non-transitory computer-readable media of claim 19, wherein the first process initializing the third instance of the pseudorandom number generator based on the first instance of the pseudorandom number generator further comprises:
generating a plurality of pseudorandom numbers based on the first instance of the pseudorandom number generator;
and initializing the third instance of the pseudorandom number generator based on the plurality of pseudorandom numbers.

21. The one or more non-transitory computer-readable media of claim 19, wherein the one or more sequences of instructions further comprise instructions that, when executed by one or more processors, cause the computing system operating the first instance of the pseudorandom number generator and the third instance of the pseudorandom number generator in parallel.

22. The one or more non-transitory computer-readable media of claim 13, wherein the one or more sequences of instructions further comprise instructions that, when executed by one or more processors, cause, prior to determining, by the first process, to generate a pseudorandom number:
receiving at least four pseudorandom values;
wherein each subsidiary pseudorandom number generator, of the first two or more subsidiary pseudorandom number generators, is based on at least two pseudorandom values of the at least four pseudorandom values.

23. The one or more non-transitory computer-readable media of claim 13, wherein the one or more sequences of instructions further comprise instructions that, when executed by one or more processors, cause the first process causing performance, in parallel, of (a) said advancing the states of the first two or more subsidiary pseudorandom number generators, and (b) said nonlinearly combining the first two or more component pseudorandom numbers.

24. The one or more non-transitory computer-readable media of claim 13, wherein the one or more sequences of instructions further comprise instructions that, when executed by one or more processors, cause:
utilizing, by the first process for an application, the first set of statistically-independent pseudorandom numbers; and
utilizing, by the second process for the application, the second set of statistically-independent pseudorandom numbers;
wherein said utilizing the first set of statistically-independent pseudorandom numbers for the application and said utilizing the second set of statistically-independent pseudorandom numbers for the application are performed in parallel.

* * * * *